(12) United States Patent
Ali

(10) Patent No.: US 11,093,135 B1
(45) Date of Patent: Aug. 17, 2021

(54) DRIVE PERFORMANCE, POWER, AND TEMPERATURE MANAGEMENT

(71) Applicant: Seagate Technology LLC, Cupertino, CA (US)

(72) Inventor: Abbas Ali, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 71 days.

(21) Appl. No.: 16/381,870

(22) Filed: Apr. 11, 2019

(51) Int. Cl.
*G06F 3/06* (2006.01)

(52) U.S. Cl.
CPC ............ *G06F 3/061* (2013.01); *G06F 3/0653* (2013.01); *G06F 3/0676* (2013.01); *G06F 3/0679* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 6,859,882 B2 | 2/2005 | Fung | |
| 6,954,320 B2 | 10/2005 | Yang | |
| 7,365,661 B2 * | 4/2008 | Thomas | H03M 5/08 341/117 |
| 8,429,436 B2 | 4/2013 | Fillingim et al. | |
| 8,984,216 B2 | 3/2015 | Fillingim | |
| 9,209,762 B1 * | 12/2015 | Mortazavi | H03F 3/217 |
| 9,234,921 B2 | 1/2016 | Matsuda | |
| 10,146,293 B2 | 12/2018 | Khatib et al. | |
| 10,684,977 B1 * | 6/2020 | Seger, Jr. | H04L 7/04 |
| 2007/0219747 A1 | 9/2007 | Hughes et al. | |
| 2011/0239013 A1 | 9/2011 | Muller | |
| 2013/0097433 A1 * | 4/2013 | Boorman | G06F 1/3225 713/300 |
| 2016/0085289 A1 | 3/2016 | Khatib et al. | |
| 2016/0117105 A1 * | 4/2016 | Thangaraj | G06F 3/0625 711/103 |
| 2017/0277446 A1 * | 9/2017 | Cheong | G06F 1/3268 |
| 2018/0356996 A1 * | 12/2018 | Benisty | G06F 3/0653 |

* cited by examiner

*Primary Examiner* — Charles Rones
*Assistant Examiner* — Ryan Dare
(74) *Attorney, Agent, or Firm* — Kirk A. Cesari; Christian W. Best

(57) ABSTRACT

Systems and methods are disclosed for monitoring power usage and temperature within a data storage device, and adjusting performance based on the power usage and temperature. In certain embodiments, an apparatus may comprise a data storage device (DSD) having an interface to communicate with a host device, and a circuit. The circuit may be configured to receive a first limit designation for a first operating parameter of the DSD via the interface, monitor a value of the first operating parameter of the DSD, evaluate a pending workload of operations to be performed by the DSD, estimate a future value of the first operating parameter based on the pending workload, and adjust performance of the DSD based on the future value and the first limit designation.

21 Claims, 10 Drawing Sheets

|  |  | Seq Rd | Seq Wr | Rnd Rd | Rnd Wr | Idle |
|---|---|---|---|---|---|---|
| Total (mW) | +5V | 3827 | 3496 | 1873 | 1712 | 1244 |
|  | +12V | 3562 | 3562 | 7218 | 5221 | 2887 |
|  | Sum | 7389 | 7058 | 9091 | 6933 | 4131 |
| Total (A) | +5V | 0.77 | 0.70 | 0.37 | 0.34 | 0.25 |
|  | +12V | 0.30 | 0.30 | 0.60 | 0.44 | 0.24 |
| Temperature of SoC |  | 72 | 64 | 62 | 58 | 43 |

DRIVE PERFORMANCE, POWER, AND TEMPERATURE MANAGEMENT

SUMMARY

In certain embodiments, an apparatus may comprise a data storage device (DSD) having an interface to communicate with a host device, and a circuit. The circuit may be configured to receive a first limit designation for a first operating parameter of the DSD via the interface, monitor a value of the first operating parameter of the DSD, evaluate a pending workload of operations to be performed by the DSD, estimate a future value of the first operating parameter based on the pending workload, and adjust performance of the DSD based on the future value and the first limit designation.

In certain embodiments, an apparatus may comprise a data storage device having a circuit configured to monitor a current power usage by the data storage device, evaluate a pending workload of the data storage device, generate an estimated future power usage based on the pending workload, and adjust performance of the data storage device based on the estimated future power usage.

In certain embodiments, an apparatus may comprise a data storage device (DSD) having an interface to communicate with a host device, and a circuit configured to receive a first limit designation for a first operating parameter of the DSD via the interface, monitor a value of the first operating parameter of the DSD, compare the value of the first operating parameter to the first limit designation, and reduce performance of the DSD when the value of the first operating parameter is not lower than the first limit designation.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
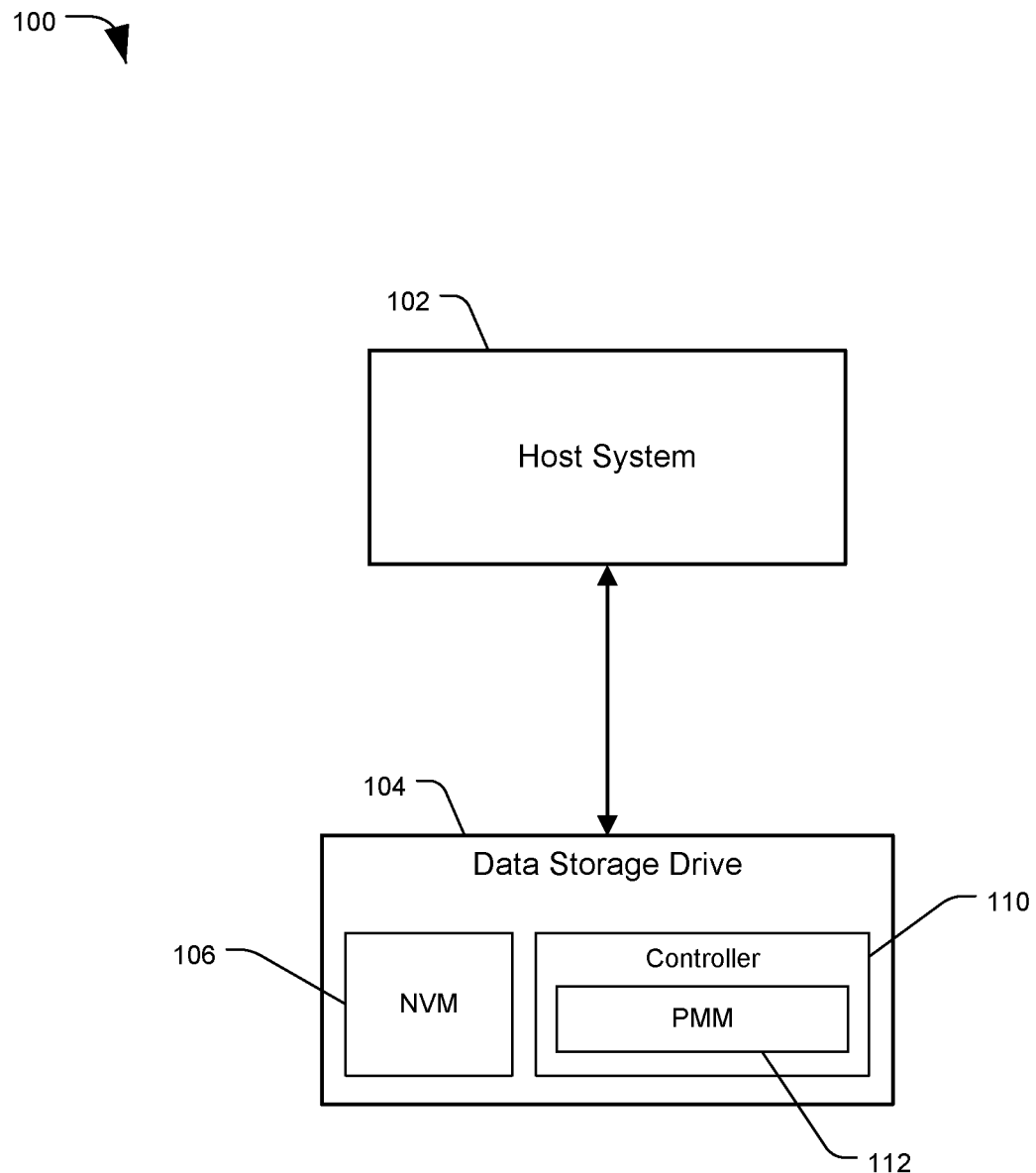
FIG. 1 is a diagram of a system configured to perform drive performance, power, and temperature management, in accordance with certain embodiments of the present disclosure.

FIG. 1 is a diagram of a system, generally designated 100, configured to perform drive performance, power, and temperature management, in accordance with certain embodiments of the present disclosure. The system 100 may include a data storage device (DSD) 104, such as a storage drive or any other device which may be used to store or retrieve data, including a hard disc drive (HDD), solid state drive (SSD), or hybrid drive. As used herein, a data storage drive may refer to a device specifically adapted for data storage and retrieval to a memory internal to the drive, not including more general purpose processing devices such as computers, server enclosures, RAID (redundant array of independent discs or drives) controller devices, and smart devices, although the DSD 104 and the teachings herein are not limited to such drives. The DSD 104 may include a memory 106 and a controller 110. The memory 106 may comprise one or more non-volatile memory (NVM) data storage mediums, such as solid state memory (sometimes referred to herein as SSM or NVSSM) including NAND flash memory, one or more hard disc memories, other types of memory, or a combination thereof. The controller 110 may be one or more processors or circuits configured to perform data access operations, such as reads or writes (also called program operations), to the memory 106. Data retrieved from the memory 106, or to be stored to the memory 106, may be processed via the controller 110, a read/write (R/W) channel, or other elements for encoding or decoding data, error correction, or other processing.

The system 100 may include a host device 102, which may also be referred to as the host system, host computer, or simply 'host'. The host 102 can be one or more server-class computers, desktop computers, laptop computers, workstations, RAID controllers, tablet computers, telephones, music players, set top boxes, a control system of a self-driving vehicle, other electronic devices, or any combination thereof. The host 102 and DSD 104 may be connected by way of a wired or wireless connection, or by a local area network (LAN) or wide area network (WAN). In some embodiments, the DSD 104 can be a stand-alone device not included in a host 102 (e.g. a removable data storage device having its own case or housing). The host 102 may issue data access requests, such as read or write requests, to the DSD 104. In response, the DSD 104 may perform data access operations on the memory 106 via the controller 110 based on the requests.

A DSD 104 may have a number of parameters that may be important to a customer, such as its throughput or "performance" (e.g. a number of input/output operations per second, IOPS), the power level of power consumption of the DSD 104, and a temperature of the DSD 104. Parameters such as power level or temperature may be especially relevant to data centers or other high volume customers, which may need to pay to cool spaces having a large number of computing devices and which may need to control power demands for those computing devices. If the temperature of one or more drives gets too high, it may lead to an increased number of read or write errors, or to actual damage to and failure of a drive. If there is more power demand from a bank of devices than a data center can provide at a given time, it may likewise lead to errors in device operations. Drive power and temperature may therefore be critical components of the total cost of ownership (TCO) of the drive for a customer.

Accordingly, a DSD 104 that is able to measure performance, power usage, temperature, or a combination thereof, during an operational mode of the DSD 104 (e.g. in the field operation, versus factory testing) may be valuable. A DSD 104 that can monitor parameters such as power level without significant alterations to the architecture of the drive would drive up value while keeping costs low. Further, the DSD 104 may be configured to determine relationships and estimates between workloads, power usage, and temperature. A host 102 may be able to specify thresholds for one or more parameters, and the DSD 104 may adjust performance of other parameters to stay within the specified parameter. In some embodiments, the DSD 104 or host 102 may use correlations between the parameters determined or estimated by the DSD 104 to make predictive adjustments to the DSD's operations.

Accordingly, the system 100 may include a parameter management module (PMM) 112, such as included in the controller 110, to measure parameters such as performance or workload, power level, temperature, or a combination thereof. In some examples the PMM 112 may be a dedicated circuit, or firmware executed by the controller 110. The PMM 112 may use the measured parameter values to adjust other parameters, reactively or predictively, to keep selected parameters within selected thresholds. An example embodiment of system 100, including a more detailed diagram of DSD 104, is depicted in FIG. 2.

Figure 2:
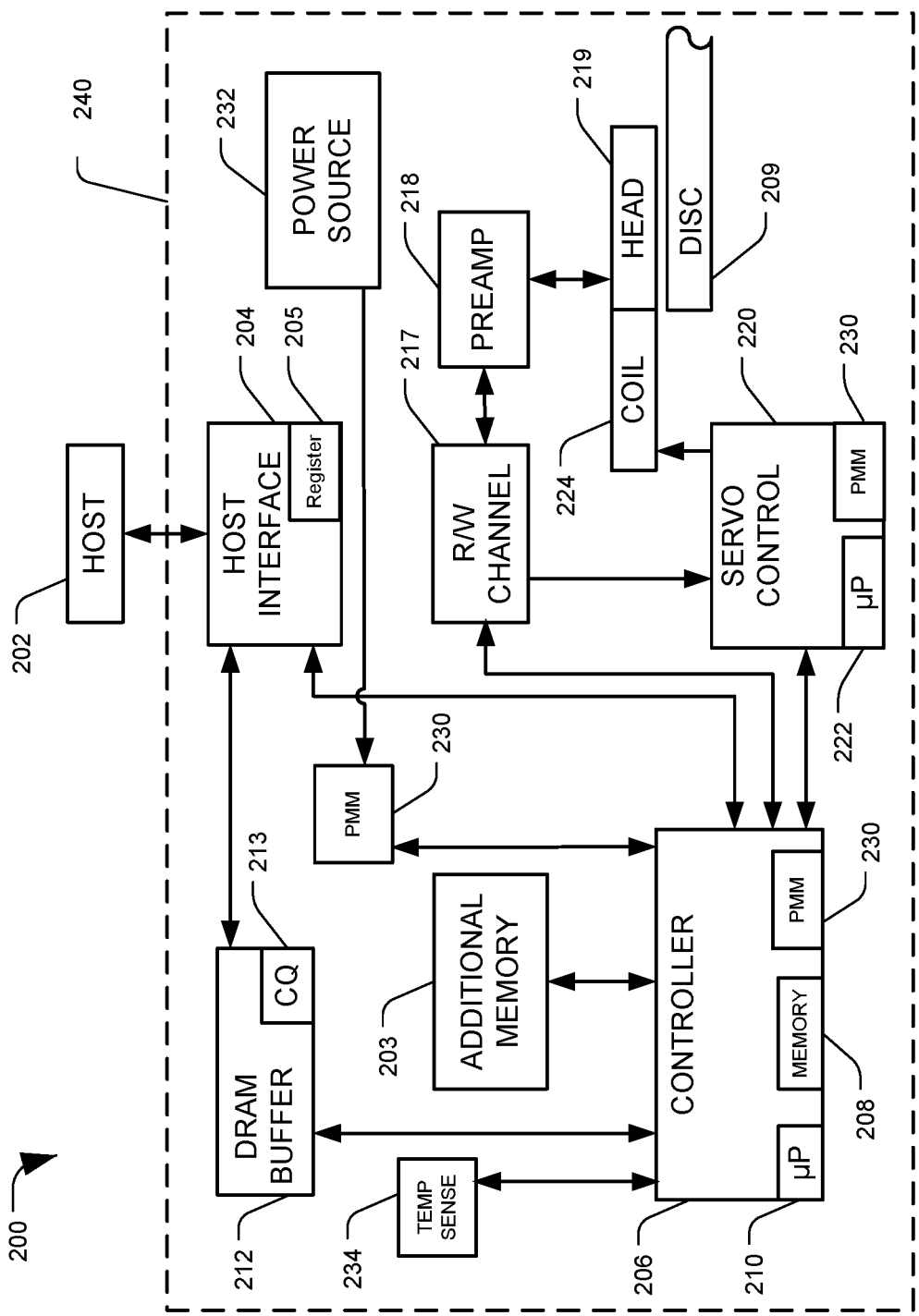
FIG. 2 is a diagram of a system configured to perform drive performance, power, and temperature management, in accordance with certain embodiments of the present disclosure.

FIG. 2 is a diagram of a system, generally designated 200, configured to perform drive performance, power, and temperature management, in accordance with certain embodiments of the present disclosure. Specifically, FIG. 2 provides a functional block diagram of an example data storage device (DSD) 200, which may be an example of the DSD 104 of FIG. 1. The one or more of the circuit components of the DSD 104 may be included on a single integrated circuit (e.g. a system on a chip, SoC), may be distributed among several circuit or hardware components, may be implemented as firmware modules executed by microprocessors, or in other configurations.

The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, NVMe, Fibre Channel, Ethernet, or Thunderbolt, among others. The interface 204 may include a connector that allows the DSD 200 to be physically removed from the host 202. The DSD 200 may have a casing 240 housing the components of the DSD 200.

Commands received from the host 202 via the interface 204 may be stored into a buffer 212. The buffer 212 can be DRAM, SRAM, or other types of memory. The buffer 212 can temporarily store data during read and write operations, and can include a command queue (CQ) 213 where multiple pending host commands can be temporarily stored pending execution. Commands arriving over the interface 204 may automatically be received in the CQ 213 or may be stored there by controller 206, interface 204, or another component.

The DSD 200 can include a programmable controller 206, which can include associated memory 208, and processor 210. The controller 206 may control data access operations, such as reads and writes, to one or more disc memories 209. The DSD 200 may include an additional memory 203 instead of or in addition to disc memory 209. For example, additional memory 203 can be a solid state memory, which can be either volatile memory such as DRAM or SRAM, or non-volatile memory, such as NAND Flash memory. The additional memory 203 can function as a cache and store recently or frequently read or written data, or data likely to be read soon. Additional memory 203 may also function as main or long-term storage instead of or in addition to disc(s) 209. A DSD 200 containing multiple types of nonvolatile storage mediums, such as a disc(s) 209 and Flash 203, may be referred to as a hybrid storage device.

The DSD 200 can include the R/W channel 217, which can encode data during write operations and reconstruct data retrieved from a memory, such as disc(s) 209, during read operations. A preamplifier circuit (preamp) 218 can apply write currents to the head(s) 219 and provides pre-amplification of read-back signals. In some embodiments, the preamp 218 and head(s) 219 may be considered part of the R/W channel 217. A servo control circuit 220 may use servo data to provide the appropriate current to the coil 224, sometimes called a voice coil motor (VCM), to position the head(s) 219 over a desired area of the disc(s) 209. The controller 206 can communicate with a processor 222 to move the head(s) 219 to the desired locations on the disc(s) 209 during execution of various pending commands in the command queue 213.

The DSD 200 may include a power source 232, such as a battery, an alternating current (A/C) power adapter, receiving power via a physical interface (e.g. via interface 204 with the host device 202), other power sources, or a combination thereof. In some embodiments, the power source 232 may provide multiple types of voltage to power the components of the DSD 200, such as 5 volt (5V) power input for electrical components and 12V power input for mechanical components (e.g. such as the coil 224 used to move the head 219 or a spindle to spin up the disc 209).

The DSD 200 may include one or more temperature sense modules 234, such as digital thermometers, to measure the temperature at one or more locations of the DSD 200.

DSD 200 may include a performance management module (PMM) 230. The PMM 230 may perform the methods and processes described herein to monitor and adjust various parameters of the DSD 200, such as performance (e.g. IOPS, megabytes processed per second—MB/S), power, and temperature. PMM 230 may include one or more integrated circuits, such as application-specific integrated circuits (ASICs), field programmable gate arrays (FPGAs), and memory chips, and may include transistors and data storage buffers configured to perform the described parameter measurement and adjustment. In some embodiments, the PMM 230 may be part of or executed by the controller 206, although in some embodiments certain components or functionality of the PMM 230 may be located elsewhere in the DSD 200 external to the controller 206, such as in the power source 232, in the temperature sensor 234, in one or more other components, as a stand-alone circuit, or any combination thereof.

The PMM 230 may obtain or receive information from the controller 206, the power source 232, the temperature sensor 234, or other components to monitor parameters of the DSD 204. For example, the controller 206 or CQ 213 may provide information to the PMM 230 regarding a workload or throughput of the DSD 200, such as based on a number of commands in the CQ 213, a number of input/output (TO) commands completing per second (IOPS), a number of bytes of data processed over a period of time, or using some other metric. The PMM 230 may also determine a temperature of the DSD 200 using information from the temperature sensor 234, and an amount of power being used by the DSD 200 based on information obtained from the power source 232.

The PMM 230 may also determine selected operating parameter thresholds. For example, a host 202 may select or configure a maximum operating temperature or a maximum power level to be used by the DSD 200. Hosts can select operating parameters for the DSD 200 via various means, such as by using interface standards like Serial AT attachment (SATA), Serial attached SCSI (SAS), or nonvolatile memory express (NVMe) to store values to configuration registers, selecting mode pages, or via other mechanisms. In an example embodiment, the NVMe or SATA interface standards can allow the host 202 to configure a register 205 at the DSD 200 to identify a maximum power level or temperature for the DSD 200. In another embodiment, the SAS interface standard may allow the host 202 to use a Mode Select command to select a mode page that defines a selected power level or temperature threshold, which selection may be stored in register 205. While depicted as included in the host interface 204, one or more registers 205 may be located elsewhere within the DSD 200. The DSD 200 may have a default power or temperature thresholds that are not to be exceeded, which may optionally be modified by a user or host 202, or which may adjust based on circumstances. For example, if the temperature of the DSD 200 exceeds a threshold, the DSD 200 may lower a power consumption threshold.

The PMM 230 may read the register 205 or other location where the operating threshold parameters are stored, or have those parameters provided to the PMM 230. The PMM 230 may determine parameter correlations (e.g. temperature or power use to workload), and may modify operating behavior of the DSD 200 to conform to the parameter thresholds. Such operating behavior modifications can improve device performance and reliability by keeping the DSD's operational parameters within selected ranges. Determining correlations between parameters may allow the DSD 200 to optimize performance while staying within selected thresholds, rather than only using preset settings that may lower one or more parameters more than necessary.

The capability to measure power usage at the DSD 200 during operational mode (e.g. in the field when in use for data storage and retrieval by a customer) can be beneficial determining how to adjust drive parameters. Additional details on an example system for measuring power within a DSD 200 is discussed in regard to FIG. 3.

Figure 3:
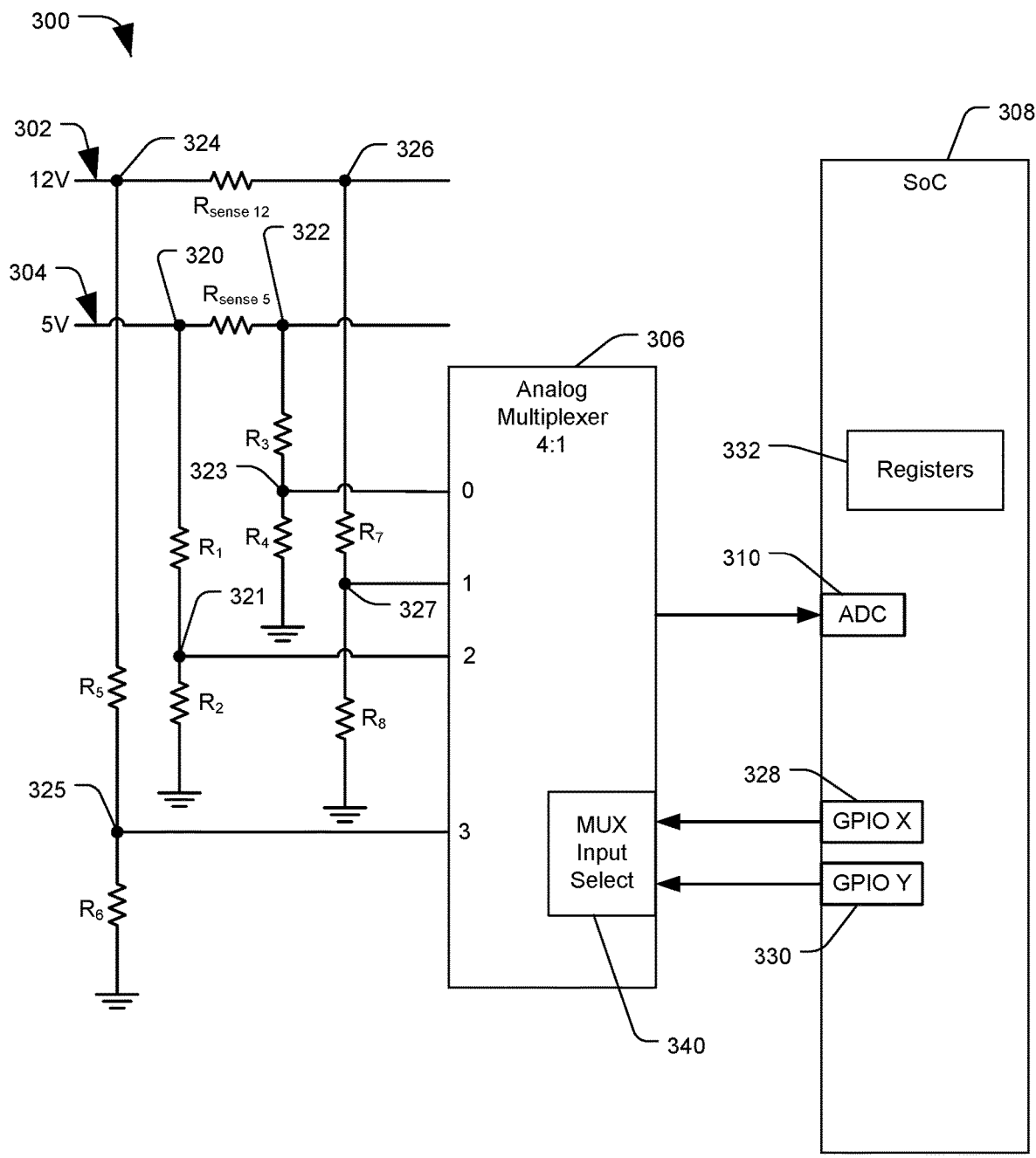
FIG. 3 is a diagram of a system configured to perform drive performance, power, and temperature management, in accordance with certain embodiments of the present disclosure.

FIG. 3 is a diagram of a system, generally designated 300, configured to perform drive performance, power, and temperature management, in accordance with certain embodiments of the present disclosure. Specifically, FIG. 3 provides a functional block diagram of components of an example DSD (such as DSD 104 of FIG. 1), which may be used to measure a power level or power usage of the DSD. The components of the system 300 may be included on a single integrated circuit, may be distributed among several circuit or hardware components, or in other configurations. One or more components of system 300, and the processes described for measuring power in the system, may be performed by a performance management module (PMM), such as PMM 112 of FIG. 1.

The system 300 may include a plurality of power lines (sometimes called "rails" or "power rails") to supply power to the DSD, such as a higher power line 302 (e.g. a 12 volt or 12V line) and a lower power line 304 (e.g. a 5 volt or 5V line). The example 12V line 302 and 5V line 304 may provide power from a power source, such as power source 232 of FIG. 2. The different power lines may provide power to various components of the DSD, such as the 5V line 304 providing power to electronic components and the 12V line 302 providing power to mechanical components of an HDD.

The example 5V line 304 may include a sense resistor $R_{sense5}$ between a first node 320 and a second node 322. The first node 320 may be coupled to a node 321, and the second node 322 may be coupled to a node 323. Node 321 may be coupled to input 2 of a multiplexer, such as a 4:1 analog multiplexer (MUX) 306. Node 323 may be coupled to input 0 of the MUX 306. A resistor $R_1$ may be situated between node 320 and node 321, and a resistor $R_2$ may be situated between node 321 and a ground. Likewise, a resistor $R_3$ may be situated between node 322 and node 323, and a resistor $R_4$ may be situated between node 323 and a ground. The resistors in series along a line, such as $R_1$ and $R_2$, may function as a voltage divider circuit, with the node situated between the resistors providing an output voltage ($V_{out}$) for that line. A divider circuit may operate to reduce the voltage to a fraction or portion of the voltage on the main rail, bringing the measured voltage line to a range that is acceptable to an analog to digital converter (ADC) for measurement.

Similarly, the example 12V line 302 may include a sense resistor $R_{sense12}$ between a first node 324 and a second node 326. The first node 324 may be coupled to a node 325, and the second node 326 may be coupled to a node 327. Node 325 may be coupled to input 3 of the MUX 306, while node 327 may be coupled to input 1 of the MUX 306. A resistor $R_5$ may be situated between node 324 and node 325, and a resistor $R_6$ may be situated between node 325 and a ground.

Likewise, a resistor $R_7$ may be situated between node 326 and node 327, and a resistor $R_8$ may be situated between node 327 and a ground.

The MUX 306 may be configured to output a signal from a selected one of the multiple input lines. Which input line will be used as the output from the MUX 306 may be selected using inputs to the MUX input select 340 of the MUX 306. In the example of a 4:1 MUX 306, the MUX input select 340 may accept a two-bit value that would identify which of the four inputs to provide to the output (e.g. 00=input 0; 01=input 1; 10=input 2; 11=input 3). The output of the MUX 306 may be provided to a measuring element, such as an analog to digital converter (ADC) 310, which may already be included in a system on chip (SoC) 308.

The SoC 308 may include an integrated circuit having multiple functional components or modules, which may include elements such as the DSD controller, volatile memory, read/write (R/W) channels, other components, or any combination thereof. In some examples, the DSD may include the MUX 306, or the MUX 306 may be a separate element of the system 300. The SoC 308 can include the ADC 310 and one or more registers 332 configured to store output from the ADC 310. For example, the SoC 308 of a DSD may include an ADC 310 within the read/write channel, or auxiliary ADCs may already be included elsewhere in the system 300. A dedicated ADC 310 could also be added for the purposes of monitoring power. The SoC 308 may also include one or more general purpose input/output (GPIO) lines, such as GPIO X 328 and GPIO Y 330.

The input to the MUX input select 340 may be provided from the SoC 308 via GPIO X 328 and GPIO Y 330, which for example may each provide a "true" or "1" value or a "false" or "0" value. For example, GPIO X 328 may provide the least significant bit of the two-bit MUX input select 340 input, while GPIO Y 330 may provide the most significant bit. The GPIO lines may be used by the SoC 308 to select which power value to measure at a time by controlling which MUX input is provided to the ADC 310.

Power usage on a power line (e.g. the 12V line 302 or the 5V line 304) may be measured by comparing a voltage above a sense resistor (the "high potential" value) to a voltage below the sense resistor (the "low potential" value) on the same line.

Power usage on the 5V line 304 may be measured based on the voltage across the $R_{sense5}$ resistor. Node 320 may receive the 5V "high potential" value, which may connect to the voltage divider of resistors $R_1$ and $R_2$ and node 321, with the output voltage received at input 2 of the MUX 306. Node 322 may receive the 5V "low potential" value, which connect to the voltage divider of resistors $R_3$ and $R_4$ and node 322, with the output voltage received at input 0 of the MUX 306.

Similarly, power usage on the 12V line 302 may be measured based on the voltage across the $R_{sense12}$ resistor. Node 324 may receive the 12V "high potential" value, which may connect to the voltage divider of resistors $R_5$ and $R_6$ and node 325, with the output voltage received at input 3 of the MUX 306. Node 326 may receive the 12V "low potential" value, which connect to the voltage divider of resistors $R_7$ and $R_8$ and node 327, with the output voltage received at input 1 of the MUX 306.

In this example, the MUX 306 can have four input lines, 0-3, with two each from the 12V and 5V power lines for the high and low potential values. Additional power lines could also be included, for example with two additional inputs to the MUX for each added power line to be measured.

The system 300 can measure power usage of the drive by measuring the power usage on each line as described herein, switching between inputs to the MUX 306 to obtain the high potential and low potential values for each power line. The DSD may be configured to know which inputs to the MUX 306 correspond to which high potential and low potential power line values from GPIO X 328 and GPIO Y 330, for example using a table stored to memory, or by using firmware configured to select and test each line in a predetermined order.

The output from the MUX 306 may be provided to the ADC 310 to measure the power of the corresponding input to the MUX 306. In order to accurately measure the power ratings, the ADC 310 may first need to be calibrated to an appropriate range (e.g. configured to detect values within a range of 0.2V to 1.6V). The power lines may provide an analog voltage power which the ADC 310 may convert to a digital value, and output that digital value to one or more registers 332 or other memory. The digital value corresponding to a particular power input line to the MUX 306 may be read from the registers 332 and stored to another memory (e.g. DRAM), and used to compare against a corresponding reading from the same power line (e.g. comparing the 12V high potential power value with the 12V low potential power value) to determine the total power usage for that power line.

For example, the system 300 may select and measure the 12V high potential line output, select and measure the 12V low potential power line, and compare the values to determine the 12V power usage of the system 300. The system 300 may then select and measure the 5V high potential line output, select and measure the 5V low potential line output, and compare the values to determine the 5V power usage of the system 300. The combined 12V and 5V power usage may represent the total power usage of the DSD. In this manner the system 300 can determine the power being used on the different power lines during drive operation. Power usage can be measured by the drive (e.g. by drive firmware executed by the controller or PMM) using mostly existing electronic components within the drive. The information about power usage by the drive can be used to adjust performance parameters of the drive, either by immediately adjusting the parameters or by estimating future power needs based on workload. An example method of measuring power in a drive is described in greater detail in regard to FIG. 4.

Figure 4:
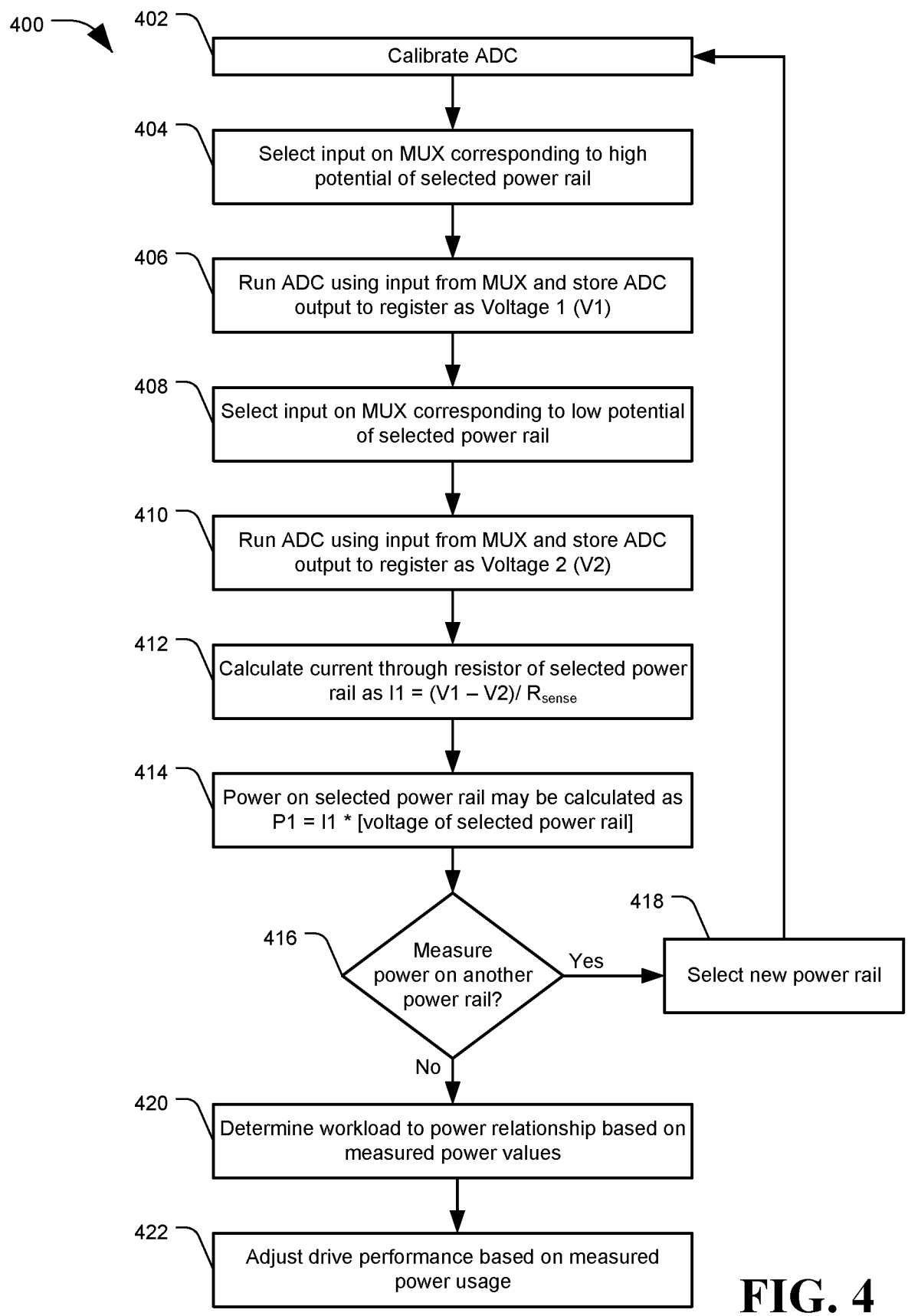
FIG. 4 depicts a flowchart of an example method for drive performance, power, and temperature management, in accordance with certain embodiments of the present disclosure.

FIG. 4 depicts a flowchart of an example method 400 of drive performance, power, and temperature management, in accordance with certain embodiments of the present disclosure. In particular, FIG. 4 depicts an example method of determining power usage at a data storage device during operation, which may be implemented by a system such as shown in FIG. 3. The method 400 may be performed by a data storage device (DSD), such as by a performance management module (PMM) 112 of DSD 104 of FIG. 1.

The method 400 may include calibrating an analog to digital converter (ADC) at a DSD in order to measure a voltage rating, at 402. Calibrating the ADC may include adjusting or setting the ADC to detect values within a specified voltage range, such as between 0.2V and 1.8V. The voltage being measured at the ADC may be a fraction of the total voltage on the power rails, which total voltage may be reduced by voltage dividers as shown in FIG. 3.

The method 400 may include selecting the input on a multiplexer (MUX) corresponding to the high potential of a selected voltage power line or power rail, at 404. For example, the selected power rail may be the 12V line, and the input corresponding to the high potential 12V input to the MUX may be selected using general purpose input/output (GPIO) lines connected to a MUX input select of the MUX. By selecting a MUX input, that input's signal can be provided from the MUX output to the ADC.

At 406, the method 400 may include running the ADC to convert the analog signal from the MUX to a digital value as the ADC output, and store the digital value to a register as Voltage 1 (V1). The method 400 may then include selecting the input on the MUX corresponding to the low potential line of the selected power rail, at 408. The ADC can be run to convert that analog signal into a digital value, and stored to a register as Voltage 2 (V2), at 410.

At 412, the method 400 may include calculating a current through the sense resistor of the selected power rail as I1 (current I)=(V1−V2)/$R_{sense}$, with $R_{sense}$ representing the resistance of the sense resistor on the selected power rail. The method 400 may include determining the power usage on the selected power rail as P1 (power usage on the selected line)=I1*[voltage of the selected power rail; e.g. 12V or 5V], at 414. The P1 value may be stored to a memory, such as a register or DRAM.

A determination may be made whether to measure power on another power rail, at 416. If more rails are to be measured, the method 400 may include selecting a new power rail as the selected power rail, at 418, and repeating the method 400 from 402 by recalibrating the ADC, if necessary. In some embodiments, the ADC may not need to be recalibrated, and the method 400 can be repeated from 404 instead.

If no further power usage is to be measured, the method 400 may optionally include determining a workload-to-power relationship based on measured power values, at 420. For example, the method 400 may include comparing the size or type of workload (e.g. comparing the queue depth for number of commands being processed, a type of commands such as sequential or random, reads or writes, etc.) against the measured power usage on one or more rails. The method 400 may alternately or additionally include measuring a temperature of the drive (e.g. at the SoC) and comparing that with the power usage, the workload, or both. The power usage across all rails may be added together to determine the total power usage of the drive, or one or more subsets of rails may be evaluated to determine the power usage of electronic components only, or mechanical components only, or some combination.

At 422, the method 400 may include adjusting drive performance based on the measured power usage. For example, if a host or user has set a maximum power usage threshold for the drive, the drive may throttle performance if the power usage is too high, or increase the performance if the power usage is below the selected threshold. Performance may also be adjusted or predicted based on the relationships between the measured power usage, the workload, the temperature, or a combination thereof. An example method of predicting future power or temperature based on workload is described in greater detail in regard to FIG. 5.

Figure 5:
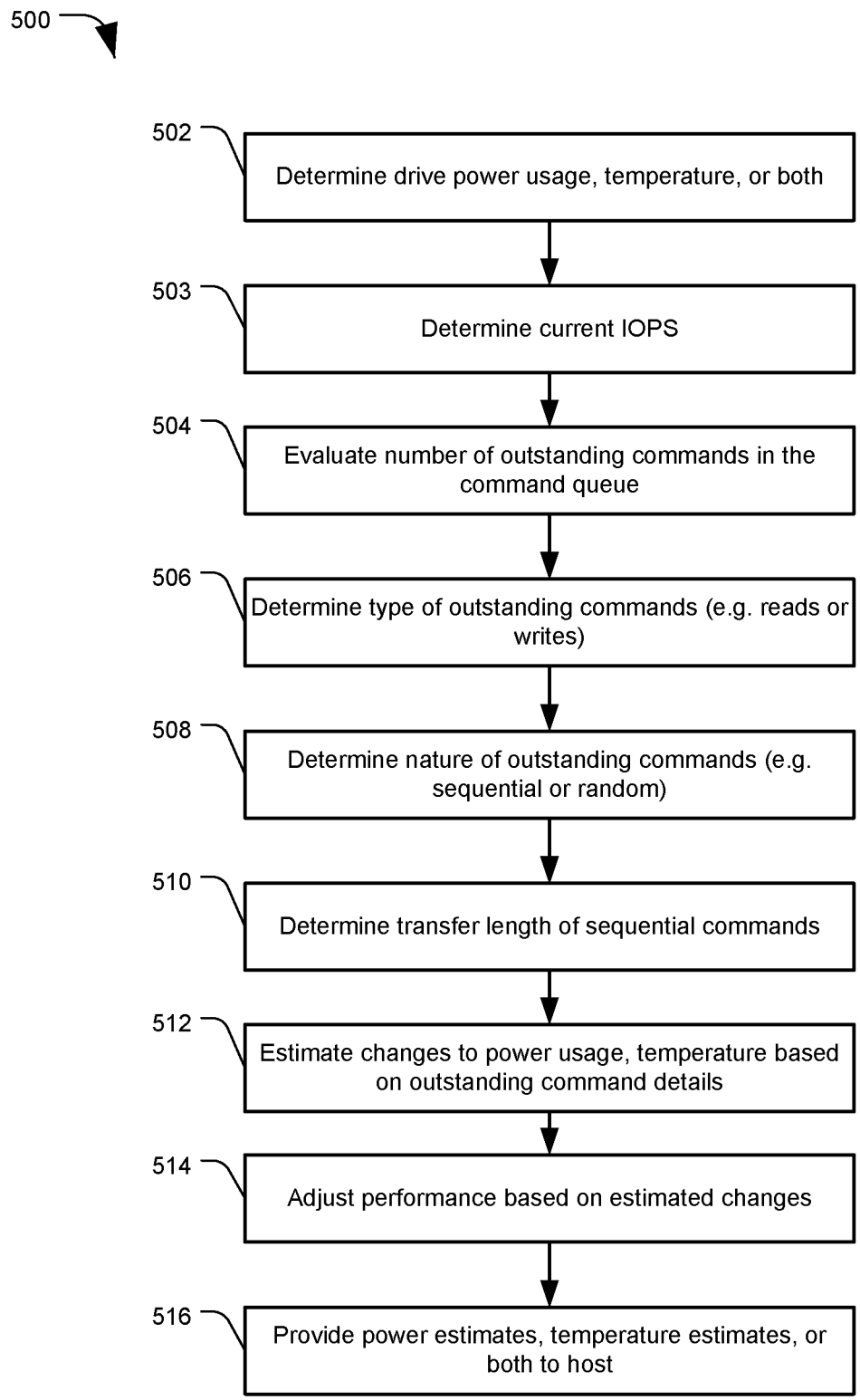
FIG. 5 depicts a flowchart of an example method for drive performance, power, and temperature management, in accordance with certain embodiments of the present disclosure.

FIG. 5 depicts a flowchart of an example method 500 of drive performance, power, and temperature management, in accordance with certain embodiments of the present disclosure. In particular, FIG. 5 depicts an example method of predicting future power usage, temperature, or both in a drive. The method 500 may be performed by a data storage device (DSD), such as by a performance management module (PMM) 112 of DSD 104 of FIG. 1.

The method 500 may include determining a drive power usage, at 502, such as by using the example method of FIG. 4. The temperature of the drive may be determined in addition or instead of the power usage. At 503, the method 500 may include determining how many commands have been completed per second (IOPS, input/output operations per second), or another performance or throughput metric such as a number of data processing calculations performed. The current performance, temperature, power consumption, or similar metrics may be used by the DSD 200 as a baseline in estimating future power usage or temperature based on workload.

The method 500 may include determining a pending or future workload, such as by evaluating a number of outstanding commands in a command queue, at 504. The command queue may be a queue at the DSD storing pending commands already received from a host, or the command queue may be one or more queues at a host storing commands not yet retrieved by the DSD, such when using an NVMe interface standard.

At 506, the method 500 may include determining types of the outstanding commands, such as read commands, write commands, delete commands, or other types. The method 500 may include tallying the number of each, or a percentage of each type of the outstanding commands, or only considering certain types of commands and disregarding others.

At 508, the method 500 may include determining a nature of the outstanding commands, such as whether the commands are sequential or random. Sequential commands may include multiple commands requesting reads or writes to a same track or area of memory so that the commands can be performed in one continuous operation without stopping to significantly move a read head to a different location, for example (e.g. data spanning several sequential tracks may be retrieved using minor head adjustments to move one track at a time, vs. moving to a track in a different zone of the disc). Meanwhile, random reads or write may include accessing various areas of the memory, potentially with seek time and rotational latency of spinning a disc and moving a read or write head between different operations. In some examples, sequential operations may require more power from electronic components (e.g. the 5V power due to a read/write channel operating continuously to encode or decode data, etc.) but may not require much power to mechanical components (e.g. 12V power) as the read head may not need to be moved significantly. Conversely, random reads or write may require more power to mechanical components for seek operations, but require less power to electronic components that may be idle during seeks).

For sequential operations, the method 500 may include determining a transfer length of the sequential commands, at 510. The transfer length may refer to the number of data blocks, sectors, or total data to be read or written during the sequential operation. Again, the system may tally up numbers of sequential operations and non-sequential commands outstanding, or may determine the average transfer length of pending operations, or may otherwise assign values or weights to the outstanding workload based on the attributes of the outstanding commands, such as type of commands, sequential or non-sequential, transfer lengths, other attributes, or any combination thereof.

The method 500 may include estimating changes to the power usage and temperature of the DSD based on the details of the outstanding commands, at 512. The estimation may be done in a number of ways. For example, values may be stored to the drive (e.g. during manufacturing) representing a change in temperature or power after a selected period of running various kinds of operations. For example, a sequential read delta temperature value and a sequential read delta power value, which may represent an increase in temperature or power after a certain number of minutes performing sequential read operations. Values may be stored for other types of operations as well, such as random writes or reads. The delta values may be based on testing performed on drives during manufacturing, or based on changes or trends in power or temperature measured by the drive and compared against existing or completed workloads. The outstanding workload may also be compared against the current drive performance (e.g. IOPS), to determine whether the amount of work performed by the drive is expected to increase or decrease from the current performance levels. The drive may use the stored values and the outstanding workload profile to predict a change to a measured power use or temperature. In some embodiments, the drive may use weighting factors in conjunction with the stored delta values to refine the estimates. For example, if the delta values are based on two minutes of performing a specific type of operation (e.g. sequential reads), but the outstanding workload indicates that less than two minutes of sequential reads are outstanding, then the delta value may be reduced to correspond to the amount of outstanding sequential reads.

In another example, a lookup table may be used to estimate the impact of various types of workloads on power or temperature. For example, factory testing of temperature or power usage based on workload may be performed for individual drives, and the testing results stored to the drives in a lookup table. In another example, a manufacturer may perform power modeling to estimate power usage or temperature in a class of drives, and perform testing on a few drives to verify the modeling. The modeled values may then be stored to all drives in the class with high confidence. An example table is illustrated in regard to FIG. 6. Combinations of stored delta values and lookup tables, or adjustments to power or temperature estimated according to other methods, may also be used. In some embodiments, the stored values, tables, or other estimation methods may be based on a "baseline" performance setting for the drive, such as operating at maximum speed or performance. The estimates may be lowered based on using reduced performance settings. The system may also be configured to generate estimates for multiple performance settings, in order to determine which performance settings to apply to stay within selected operating parameters.

After estimating changes to the power usage or temperature based on the outstanding workload, the method 500 may optionally include adjusting the performance based on those estimates, at 514. For example, if a maximum power or temperature threshold has been set by a host or user, pre-configured in the drive, or otherwise set for the DSD, the drive may adjust operating parameters to avoid going over the set thresholds if the estimates show the thresholds may be exceeded. The operating parameters or performance of the DSD may be modified in a number of example ways. The speed of performing operations may be reduced, or one or more processing cores may be temporarily deactivated or scaled back. A slower seek speed may be used, or no reads or writes may be performed during one or more revolutions of the disc to reduce power or temperature. Write operations may be prioritized over read operations (where write operations may use less power than reads), or random commands may be prioritized over sequential commands to lower power usage. The drive may also remain idle for a period of time, or until the measured temperature falls to an acceptable range, before resuming command execution. Other adjustments may also be made to reduce power consumption or heat generation.

At 516, the method 500 may optionally include providing the power estimates, temperature estimates, or both to a host or user, or a warning may be issued that one or more thresholds are expected to be exceeded. For example, rather than reducing performance automatically, the DSD may notify a host that a selected threshold is expected to be exceeded based on the current workload. The host may then take corrective action to avoid the threshold being passed, such as aborting commands at the DSD and sending them to other backup devices, shutting the DSD down, allowing the thresholds to be exceeded but limiting the future workload to minimize an amount of time the threshold is exceeded, or performing other operations in response to the notification. An example table used to estimate future power and temperature is depicted in FIG. 6.

Figure 6:
FIG. 6 depicts an example diagram of a table for a system configured to perform drive performance, power, and temperature management, in accordance with certain embodiments of the present disclosure.

FIG. 6 is a diagram of a table, generally designated 600, for a system configured to perform drive performance, power, and temperature management, in accordance with certain embodiments of the present disclosure. Specifically, FIG. 6 provides an example table 600, such as a lookup table (LUT), that may be stored to a drive memory and which may represent power and temperature modeling information based on different types of workloads. The table 600 may provide a general model of prediction of temperature and power which could be used to predict future temperature or power when commands are processed in these modes. The table 600 may be accessed by a performance management module (PMM) to predict future power or temperature usage and to adjust drive performance.

The example table 600 may list power usage in milliwatts (mW) or amps (A) for different kinds of workloads (e.g. sequential reads, sequential writes, random reads, random writes, or idle periods) for selected periods of time. The table 600 may also list temperature values for a system on chip (SoC) of a drive based on those types of workloads. Temperature of other components could also be used. In some embodiments, the temperature of the SoC and disk pack could be correlated, compared, averaged, or otherwise used to drive a relationship between them. The values in the table may represent a total power usage over those periods of time performing those workloads, or may represent an estimated change in power or temperature, or may otherwise represent values that can be used to estimate future power or temperature based on an outstanding workload profile. The values may be pre-determined and stored to the drive (e.g. by a manufacturer), or they may be populated and adjusted by the drive itself based on observed power and temperature usage while performing the corresponding type of workload.

The information from the table 600 may enable prediction or estimation of future power needs or temperature for the device based on the outstanding workload. These estimates may be provided to a host to make operation decisions regarding the drive, or the estimates may be used by the drive itself to manage operations, such as to keep within preset limits or operating thresholds for power usage or temperature. The values may be used in conjunction with current temperature or power ratings to estimate and adjust drive performance based on the outstanding workloads. For example, a current temperature reading may indicate that drive is too hot, and a current workload may indicate that too many sequential reads are being performed. The future workload may indicate that sequential read and sequential write commands are pending. Knowing the current temperature and workload, and knowing that the pending commands provide the option to pick either sequential write or sequential read commands for execution, the drive may elect to first perform the sequential write commands, which would maintain performance while using less power than sequential reads, and would bring drive temperature down. An example method for receiving power or temperature limits from a host can be seen in FIG. 7.

Figure 7:
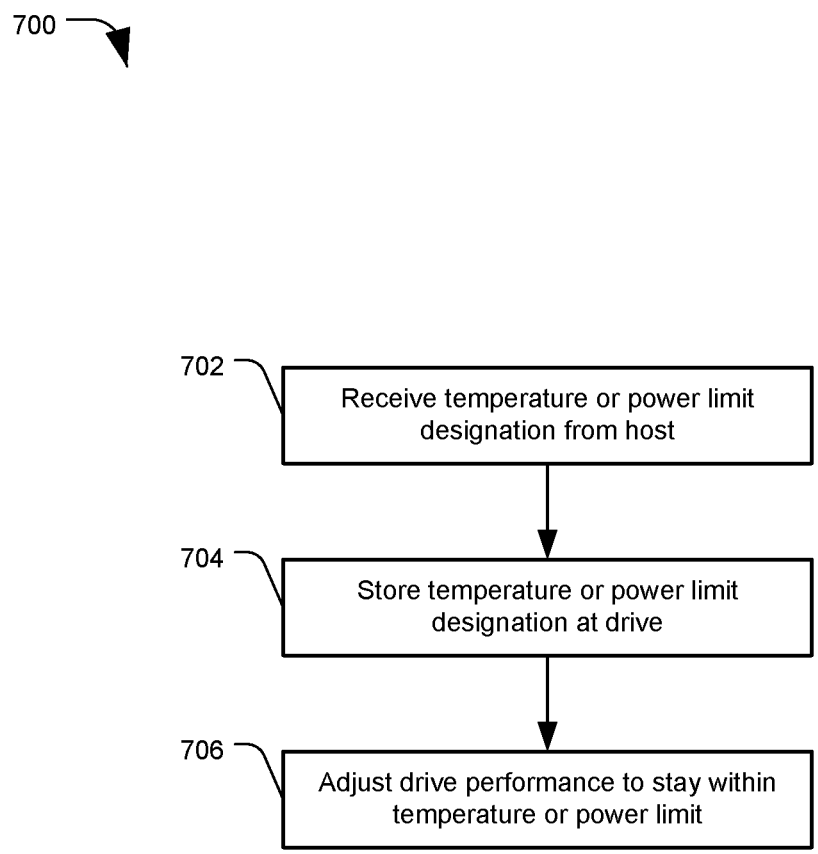
FIG. 7 depicts a flowchart of an example method for drive performance, power, and temperature management, in accordance with certain embodiments of the present disclosure.

FIG. 7 depicts a flowchart of an example method 700 of drive performance, power, and temperature management, in accordance with certain embodiments of the present disclosure. In particular, FIG. 7 depicts an example method of adjusting drive performance based on host-specified operating limits. The method 700 may be performed by a data storage device (DSD), such as by a performance management module (PMM) 112 of DSD 104 of FIG. 1.

The method 700 may include receiving a temperature limit designation, a power limit designation, or both, from a host device, at 702. The limit designations may identify a temperature or power usage that the drive is not to exceed (e.g. a hard limit that the drive must remain below), or a maximum that the drive is to attempt to keep below (e.g. a soft limit, such that if the drive reaches or exceeds that limit, the drive adjusts performance so as to stay at or fall back below the designated limit). In the case of a hard limit, the drive may attempt to adjust performance when it approaches the hard limit, such as when a secondary threshold lower than the hard limit is reached.

The host may provide the limit designations through various means, which may differ according to the interface standard used to communicate between the host and the drive. For example, using the SAS (serial attached SCSI) interface standard, the host may use mode pages to select or designate temperature or power level limits. In an example using the nonvolatile memory express (NVMe) or NVMe over Fabrics (NVMe-oF or NVMoF) standards, the host may be able to access one or more configuration registers at the DSD, and may designated power or temperature limits using these configuration registers.

At 704, the method 700 may include storing the temperature or power limit designation to a memory of the drive. For example, the limits may be set each time the drive is powered on, with the designations stored to a volatile memory such as DRAM. In some embodiments, the designations may be persistent, with the settings stored to a non-volatile memory, and loaded from the non-volatile memory to an operating memory when the device is powered on.

The method 700 may include adjusting the drive performance to stay within the designated temperature or power limits, at 706. For example, when the drive measures its temperature or power usage, or predicts future temperature or power usage based on a pending workload, the drive may determine whether the temperature or power usage have or are expected to exceed the set limits. In response, the drive may implement operating or performance changes that will reduce the amount of heat generated or the power used to stay below the specific limits, or bring temperature or power consumption back within the limits. An example method of monitoring and adjusting performance at the drive is discussed in regard to FIG. 8.

Figure 8:
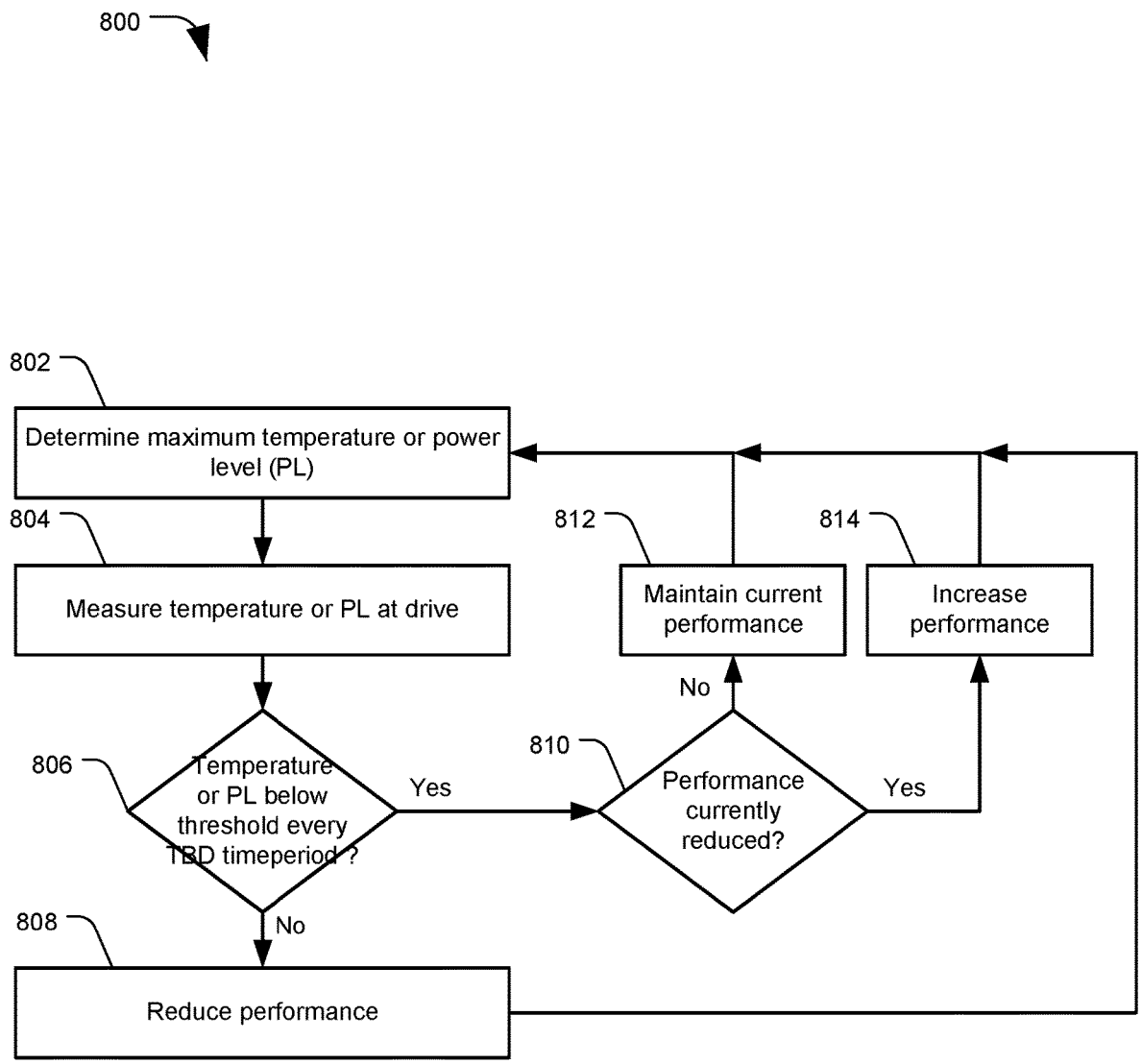
FIG. 8 depicts a flowchart of an example method for drive performance, power, and temperature management, in accordance with certain embodiments of the present disclosure.

FIG. 8 depicts a flowchart of an example method 800 of drive performance, power, and temperature management, in accordance with certain embodiments of the present disclosure. In particular, FIG. 8 depicts an example method of adjusting drive performance based on specified operating limits. The method 800 may be performed by a data storage device (DSD), such as by a performance management module (PMM) 112 of DSD 104 of FIG. 1.

The method 800 may include determining maximum temperature or power level limits or thresholds for the device, at 802. For example, the temperature or power limits may be designated by a host device and stored to a memory of the DSD, or the limits may be preset for the device as part of the DSD's pre-configured operating parameters. The DSD may be configured to enforce a temperature limit, a power limit, or both. The limits may be loaded into a working memory such as DRAM or a register of a controller for use during drive operation.

At 804, the method 800 may include measuring a temperature or power level at the drive. For example, temperature may be measured using one or more digital thermometers integrated into the drive. Power level may be determined based on measuring a power usage on one or more power rails of the DSD, such as using the method described in regard to FIG. 4.

A comparison may be made whether the measured temperature or power level is below a threshold, at 806. The threshold may be the actual temperature or power level limits set by a host or pre-configured in the drive, or the threshold may be a lower threshold to prevent the drive from reaching the hard operating temperature or power limits.

If the temperature or power level are not below the threshold, at 806, the method 800 may include reducing performance of the DSD, at 808. Various parameters may be adjusted to reduce the drive's performance and lower temperature or power usage. For example, the drive firmware could increase a delay in command processing to increase latency. Write commands, which may require lower power than read commands, may be prioritized. Similarly, random commands (preferably random write command if possible) may be prioritized over long sequential commands. FIG. 6 helps to understand which commands may be preferred in high power usage and high temperature cases. An additional proportional delay could also be added to command processing. A slower JIT (just-in-time) seek technique could be employed to reduce power or temperature. If commands are random in nature, a slower or slowest seek speed may be used to save power and lower temperature. A "missed" or extra disc revolution may be added between executions of some commands, as an already spun-up disc requires little power to keep moving. Skipping revolutions or skipping tracks can reduce power, and can be performed using many techniques, such as adding extra delay in a command processing routine, or starting a command late. In multi-core processor architectures, a processing core may be disabled or lower voltage could be applied to one of the cores. For example, lowering channel voltage can be used to save power (e.g. lower Vcore2) for writes, while keeping the voltage for reads consistent. Similarly, lower Vcore2 may be used for inner diameter (ID) reads compared to outer diameter (OD) reads, where the inner diameter of a hard disc may refer to the tracks closest to the spindle on which the disc spins. Another technique can include placing the drive into an idle mode for a set period of time. The idle state can bring power and temperature of the drive down as performance idle mode enables power saving feature such as channel dozing, preamp idling, DRAM in self refresh mode, controller in wait for interrupt (WFI), etc. After the drive cools down to a selected temperature, it can resume executing commands as necessary. Other methods of lower power usage or temperature are also possible. These techniques can be applied differently for different modes (with different temperature and power conditions) and for different workloads.

Once performance has been reduced at 808, the method 800 may continue to determine the maximum temperature or power level, at 802, and measuring the temperature or power level, at 804. Determining in the maximum temperature or power level may not need to be performed again, for example if the drive has pre-set power or temperature limits. However, if the host may adjust the maximum power or temperature settings, the maximum thresholds may need to be checked periodically or in response to a new setting from the host.

If a determination is made that the temperature or power level are below the threshold, at 806, the method 800 may include determining whether the performance of the DSD is currently being reduced, at 810, for example due to previously exceeding the threshold limits. If not, the method 800 may include maintaining the current performance level, at 812. If the drive has optional high-performance modes that may use additional power or result in greater heat, the drive may optionally engage those high-performance parameters while the system is below the thresholds. However, if it is determined the performance of the system is currently being reduced, at 810, the method 800 may include increasing the performance, at 814, lifting some or all of the performance restrictions for the DSD. After either maintaining the current performance at 812, or increasing the performance at 814, the method 800 may then continue monitoring the maximum limits, at 802, and temperature or power, at 804. In this manner, the DSD 800 may dynamically adjust performance parameters up or down based on temperature, power usage, or both. In some embodiments, the adjustments to performance or power level may be based on estimated or predicted future power levels or temperature rather than a current power level or temperature, with the firmware adjusting device performance before the set limits are reached. These predictions or estimates can be used intelligently by the DSD, provided to the host to allow host-based workload adjustments, or both. An example method of providing estimated operating parameters to the host is discussed in regard to FIG. 9.

Figure 9:
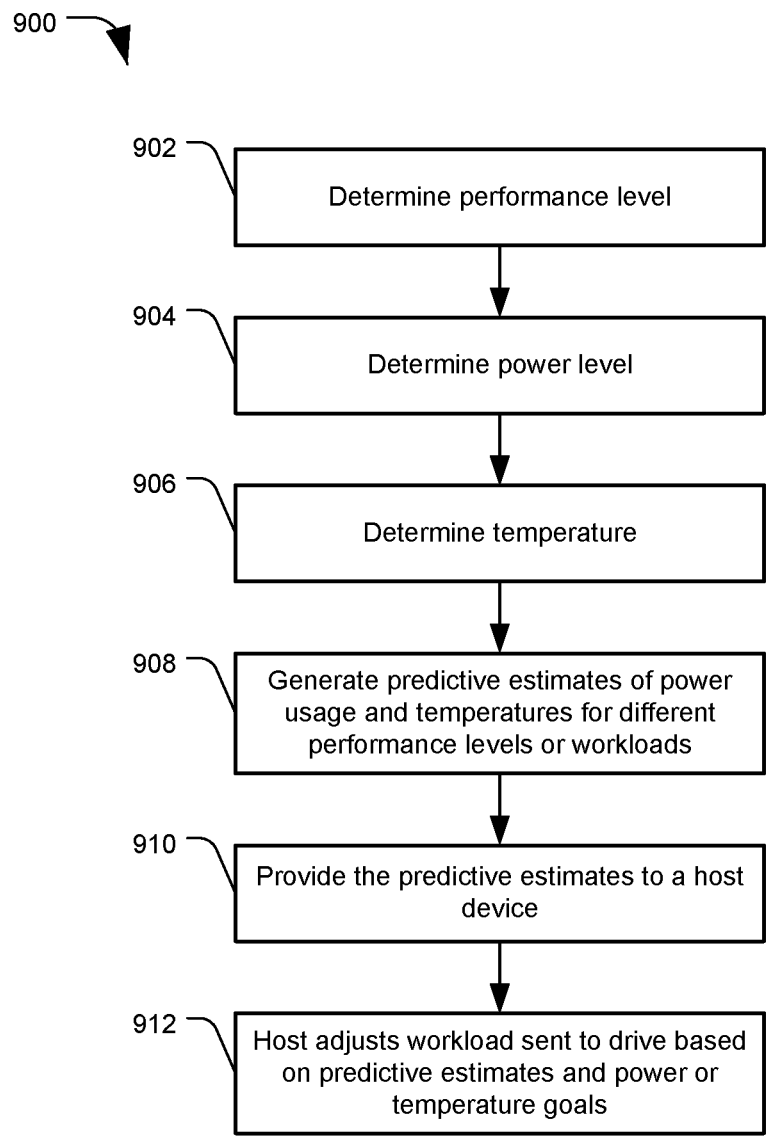
FIG. 9 depicts a flowchart of an example method for drive performance, power, and temperature management, in accordance with certain embodiments of the present disclosure.

FIG. 9 depicts a flowchart of an example method 900 of drive performance, power, and temperature management, in accordance with certain embodiments of the present disclosure. In particular, FIG. 9 depicts an example method of a method of adjusting a workload of a system based on drive-generated predictive estimates of power usage or temperature. The method 900 may be performed by a data storage device (DSD), such as by a performance management module (PMM) 112 of DSD 104 of FIG. 1, and may be partially performed by a host device connected to the DSD.

The method 900 may include determining a performance level of the DSD, at 902. Performance may be measured based on completed commands within a selected period of time, input/output operations per second (IOPS), or other metrics that can be used to determine the amount of work being performed by the DSD. In some examples, the performance level may include an outstanding workload of commands waiting to be executed by the DSD. At 904, the method 900 may include determining a power level of the DSD. The power level may be represented by an amount of power being used by the device, which for example may be measured as described in relation to FIGS. 3 and 4. The method 900 may also include determining a temperature of the DSD, at 906, such as by using thermometers, die temperature sensors, or thermistors included within the DSD. Performance, power level, and temperature may be measured the PMM of the DSD, such as through the device firmware. In some embodiments, the method may omit measuring one or more attributes, such as temperature, or current performance (e.g. instead only measuring a pending workload).

At 908, the method 900 may include generating predictive estimates of power usage, temperature, or both, for different performance levels or workloads. For example, the method 900 may include evaluating a number, type, and nature of outstanding commands, and estimating the impact those commands may have on power usage or temperature, as described in regards to FIGS. 5 and 6. One or more estimates may be generated, for example based on the power or temperature impacts of running the DSD at various throttled levels of performance. For example, a drive may be configured to generate estimates from the current temperature and outstanding workload, based on operating at full performance, operating with one or two performance reductions applied, or based on all potential performance reductions applied.

The one or more predictive estimates may be provided from the DSD to a host device, at 910. The host may desire to maintain a certain level of performance despite increased power usage or temperature, or may wish to scale back the workload sent to the device, or performance of the device, based on the estimates. The host may also merely log the estimates of the operating parameters over time, for example in order to determine correlations or trends between commands sent to the DSD and the resulting temperature or power levels.

At 912, the method 900 may include the host adjusting the workload sent to the drive based on the predictive estimates, and the host's power or temperature goals. In some embodiments, the host may select which performance reductions to implement at the DSD in order to reduce the power level or temperature of the device. For example, the host may use mode pages via an SAS interface protocol, or configurable registers at the DSD via the NVMe interface protocol, or via other methods or interface standards like SATA, to designate operating parameters for the DSD in response to the estimates. In this manner, a host may carefully control performance, power level, and temperature at one or more DSDs based on intelligent operating parameters estimates from the DSDs. Similarly, FIG. 10 provides an example method of the DSD using the estimates internally to stay under power or temperature limits.

Figure 10:
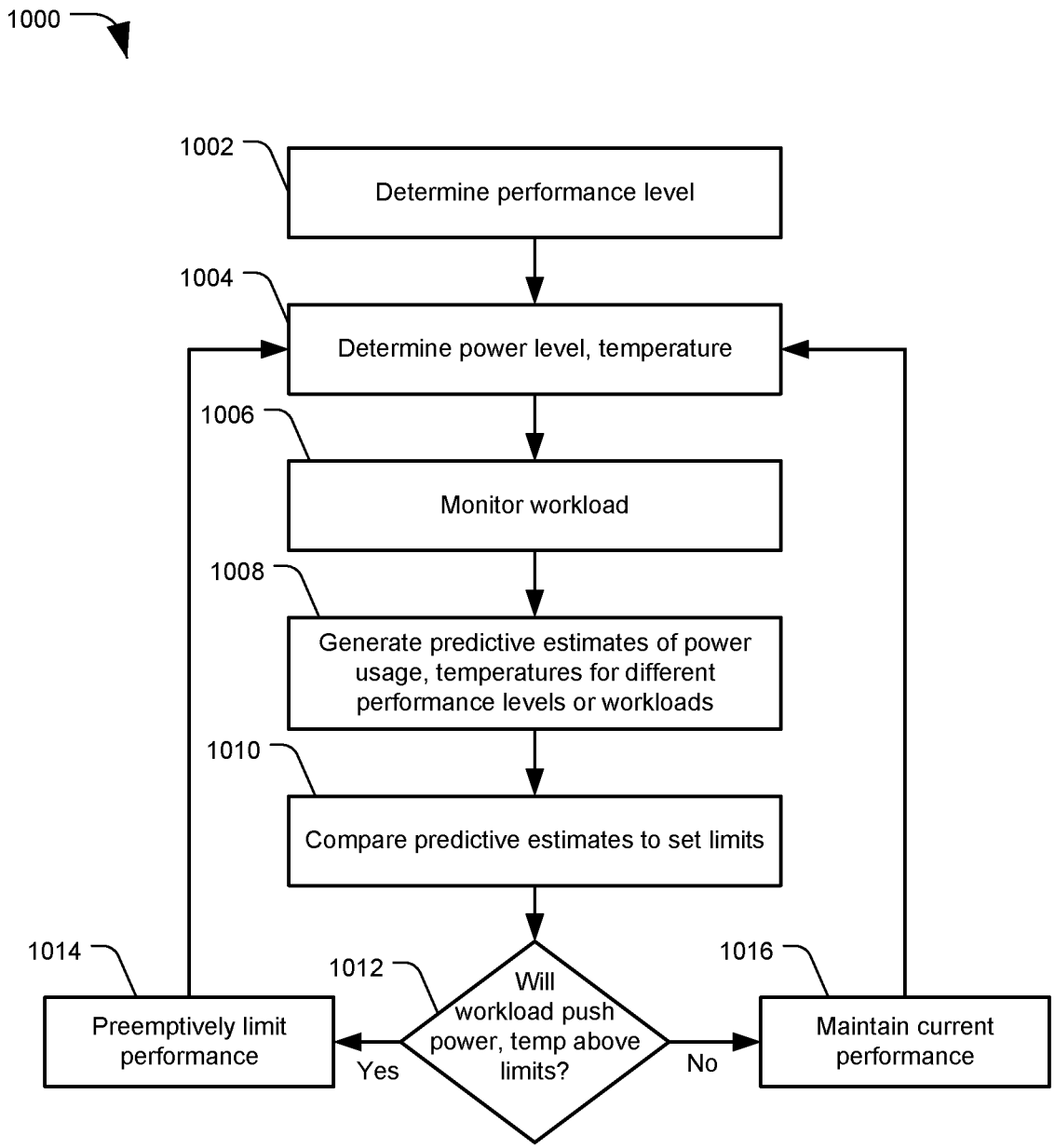
FIG. 10 depicts a flowchart of an example method for drive performance, power, and temperature management, in accordance with certain embodiments of the present disclosure.

FIG. 10 depicts a flowchart of an example method 1000 of drive performance, power, and temperature management, in accordance with certain embodiments of the present disclosure. In particular, FIG. 10 depicts an example method of a method of adjusting a workload of a system based on drive-generated predictive estimates of power usage or temperature. The method 1000 may be performed by a data storage device (DSD), such as by a performance management module (PMM) 112 of DSD 104 of FIG. 1.

Similar to method 900, the method 1000 may include determining a performance level of the drive, at 1002, and determining one or more of a power level or temperature of the drive, at 1004. The method 1000 may include monitoring an outstanding workload of pending operations to perform, at 1006. The method 1000 may include generating, at the drive, one or more predictive estimates of power usage or temperature, based on the outstanding workload, at 1008. The estimates may include predictions based on different performance levels for the workload (e.g. performing the workload at maximum performance, at a first throttling level, a second throttling level, etc. up to a maximum throttling level, with additional or different performance throttling parameters set for each throttling level.

At 1010, the method 1000 may include comparing the predictive estimates to set limits for power usage or temperature. The limits may include hard limits that the drive is not to exceed, and may be set by a host or pre-set for the drive, e.g. by a manufacturer. If the estimates indicate that the workload will not push the power usage or temperature above the limits, at 1012, the method 1000 may include maintaining a current performance level at the drive, at 1016, or potentially increasing the performance level if the drive is operating at a sub-optimal performance level. If, however, the predictive estimates indicate that the workload will push the power usage or temperature above the set limits, at 1012, the method 1000 may include preemptively limiting performance of the drive, at 1014, so that the limit is not reached. Once the performance level has been maintained, at 1016, or limited, at 1014, the method 1000 may then continue to monitor or determine the drive power usage, temperature, and workload, and generate new predictive estimates as the measurements change.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a data storage device (DSD) having:
      an interface to communicate with a host device;
      a circuit configured to:
         receive a first limit designation for a first operating parameter of the DSD from the host device via the interface;
         monitor a value of the first operating parameter of the DSD;
         evaluate a pending workload of operations to be performed by the DSD;
         estimate a future value of the first operating parameter based on the pending workload, including:
            determine characteristics of outstanding commands in a command queue;
            retrieve one or more delta values from a memory of the DSD representing a change in the first operating parameter during a period of time executing commands based on characteristics of selected commands; and
            generate the future value of the first operating parameter based on a current value of the operating parameter modified using the one or more delta values and the characteristics of the outstanding commands; and
         adjust performance of the DSD based on the future value and the first limit designation.

2. The apparatus of claim 1 further comprising:
   wherein the first limit designation includes a temperature of the DSD, a power usage of the DSD, or the temperature of the DSD and the power usage of the DSD.

3. The apparatus of claim 1 comprising the circuit further configured to:
   estimate a future value of the first operating parameter by:
      determine the characteristics of outstanding commands in a command queue, further including:
         determine a number of the outstanding commands;
         determine what type of commands are included in the outstanding commands;
         determine a nature of the outstanding commands, including identifying commands that are sequential and commands that are random; and
         determine a transfer length of sequential commands.

4. The apparatus of claim 1 comprising the circuit further configured to:
   the first operating parameter is a power usage of the DSD;
   the circuit is configured to:
      monitor the power usage on a power supply rail of the DSD by measuring voltage of a high potential line from the power supply rail and a low potential line using an analog to digital converter; and
      switch between measuring the high potential line and the low potential line by controlling which line is output from a multiplexer of the DSD to the analog to digital converter.

5. The apparatus of claim 4 comprising the circuit further configured to:
   monitor the power usage includes:
      select a high potential power input of the power rail using an input select;
      determine a voltage of the high potential power input using an analog-to-digital converter (ADC);
      select a low potential power input of the power rail using the input select;
      determine a voltage of the low potential power input using the ADC; and
      determine a power usage on the power rail based on the voltage of the high potential power input and a voltage of the low potential power input.

6. The apparatus of claim 1 further comprising:
   the data storage device (DSD) further includes a digital thermometer configured to measure a temperature of the DSD; and
   the first operating parameter includes the temperature of the DSD.

7. An apparatus comprising:
   a data storage device having a circuit configured to:
      monitor a current power usage by the data storage device, including:
         select a high potential power input of a selected power rail using an input select;
         determine a voltage of the high potential power input using an analog-to-digital converter (ADC);
         select a low potential power input of the selected power rail using the input select;
         determine a voltage of the low potential power input using the ADC; and determine a power usage on the selected power rail based on the voltage of the high potential power input and a voltage of the low potential power input;
evaluate a pending workload of the data storage device;
generate an estimated future power usage based on the pending workload; and
adjust performance of the data storage device based on the estimated future power usage.

8. The apparatus of claim 7 comprising the circuit further including:
a first power rail configured to supply power to a first set of components of the data storage device;
a multiplexer including:
a first input to receive a first high potential power input from the first power rail;
a second input to receive a first low potential input from the first power rail;
the ADC configured to convert an analog signal from the output of the multiplexer to a digital value representing a voltage on a power input provided to the ADC from the output; and
the input select configured to receive an indication of which power input of the multiplexer to provide at the output.

9. The apparatus of claim 8 comprising the circuit further including:
the first power rail includes a sense resistor situated between a first node providing the high potential input and a second node providing the low potential input;
the selected power rail includes the first power rail;
the circuit configured to determine the power usage on the first power rail includes the circuit further configured to:
determine a current through the sense resistor based on a difference between the voltage of the high potential power input and the voltage of the low potential power input, divided by a resistance rating of the sense resistor; and
determine the power usage on the first power rail based on the current through the sense resistor multiplied by a voltage rating of the first power rail.

10. The apparatus of claim 8 comprising the circuit further including:
a second power rail having a lower voltage rating than the first power rail, the second power rail configured to supply power to a second set of components of the data storage device;
the multiplexer including:
a third input to receive a second high potential power input from the second power rail;
a fourth input to receive a second low potential input from the second power rail;
the circuit configured to monitor the current power usage includes the circuit configured to:
determine a power usage on the first power rail and a power usage on the second power rail; and
determine the power usage by the data storage device based on the power usage on the first power rail and the power usage on the second power rail.

11. The apparatus of claim 7 further comprising:
the circuit is configured to evaluate the pending workload by determining details of outstanding commands in a command queue, including:
determine a number of the outstanding commands;
determine what type of commands are included in the outstanding commands;
determine a nature of the outstanding commands, including identifying commands that are sequential and commands that are random; and
determine a transfer length of sequential commands.

12. The apparatus of claim 11 further comprising:
the circuit configured to generate the estimated future power usage includes the circuit configured to:
retrieve one or more delta values from a memory of the data storage device representing a change in power usage by the data storage device after a period of time executing commands based on a type, nature, and transfer length of selected commands; and
generate the estimated future power usage based on the current power usage modified using the one or more delta values and the details of the outstanding commands.

13. The apparatus of claim 7 further comprising:
the data storage device includes an interface circuit configured to communicate with a host device;
the selected threshold is selected by the host device via an indication received over the interface circuit; and
the circuit configured to adjust the performance includes the circuit configured to reduce the performance of the data storage device to use less power when the estimated future power usage exceeds a selected threshold.

14. A method comprising:
receiving, at a data storage device (DSD), a first limit designation for a first operating parameter of the DSD from a host device connected via an interface of the DSD;
monitoring, at the DSD, a value of the first operating parameter;
evaluating a pending workload of operations to be performed by the DSD;
estimating, at the DSD, a future value of the first operating parameter based on the pending workload, including:
determining characteristics of outstanding commands in a command queue;
retrieving one or more delta values from a memory of the DSD representing a change in the first operating parameter during a period of time executing commands based on characteristics of selected commands;
generating the future value of the first operating parameter based on a current value of the operating parameter modified using the one or more delta values and the characteristics of the outstanding commands; and
adjusting performance of the DSD based on the future value and the first limit designation.

15. The method of claim 14 further comprising:
the first operating parameter includes a temperature of the DSD;
monitoring the value of the first operating parameter via a digital thermometer configured to measure a temperature of the DSD;
receiving, at the DSD via the interface, a second limit designation for a second operating parameter of the DSD, the second operating parameter including a power usage of the DSD;
monitoring a value of the second operating parameter of the DSD;
comparing the value of the second operating parameter to the second limit designation; and
reducing performance of the DSD when either the value of the first operating parameter is not lower than the first limit designation or the value of the second operating parameter is not lower than the second limit designation.

16. The method of claim 14 further comprising:

the first operating parameter includes a power usage of the DSD; and monitoring, at the DSD, the power usage on a power supply rail of the DSD by measuring voltage of a high potential line from the power supply rail and a low potential line using an analog to digital converter.

17. The method of claim 16 further comprising:

switching between measuring the high potential line and the low potential line by controlling which line is output from a multiplexer of the DSD to the analog to digital converter.

18. The method of claim 14 further comprising:

the first operating parameter includes a temperature of the DSD; and monitoring the value of the first operating parameter via a digital thermometer configured to measure a temperature of the DSD.

19. The method of claim 14 further comprising:

determining the characteristics of outstanding commands in the command queue, includes:

determining a number of the outstanding commands;

determining what type of commands are included in the outstanding commands;

determining a nature of the outstanding commands, including identifying commands that are sequential and commands that are random; and determining a transfer length of sequential commands.

20. The method of claim 14 further comprising:

receiving an identifier of the first limit designation from the host device via direct memory access, in which the host device programs a register of the DSD directly; and reading the register to obtain the first limit designation to compare against the value of the first operating parameter.

21. The method of claim 14 further comprising:

maintaining mode pages corresponding to parameter settings supported by the DSD;

receiving a mode select command from the host device identifying a mode page defining the first limit designation; and configuring operation of the DSD based on the mode page selected by the host device.

\* \* \* \* \*